(12) United States Patent
Dorman et al.

(10) Patent No.: US 10,846,074 B2
(45) Date of Patent: Nov. 24, 2020

(54) IDENTIFICATION AND HANDLING OF ITEMS TO BE IGNORED FOR SYNCHRONIZATION WITH A CLOUD-BASED PLATFORM BY A SYNCHRONIZATION CLIENT

(71) Applicant: Box, Inc., Los Altos, CA (US)

(72) Inventors: Griffin Dorman, San Francisco, CA (US); Eric Vandenberg, Mountain View, CA (US); Florian Jourda, San Fransicso, CA (US); Kunal Parmar, San Jose, CA (US); Dave Sawyer, Mountain View, CA (US); Benjamin Campbell Smith, Mountain View, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 14/275,890

(22) Filed: May 13, 2014

(65) Prior Publication Data

US 2015/0339113 A1 Nov. 26, 2015

Related U.S. Application Data

(60) Provisional application No. 61/822,170, filed on May 10, 2013.

(51) Int. Cl.
*G06F 8/65* (2018.01)
*G06F 16/178* (2019.01)
(Continued)

(52) U.S. Cl.
CPC ............... *G06F 8/65* (2013.01); *G06F 9/445* (2013.01); *G06F 16/178* (2019.01);
(Continued)

(58) Field of Classification Search
CPC ............... G06F 8/60; G06F 8/65–8/68
See application file for complete search history.

(56) References Cited

U.S. PATENT DOCUMENTS

| 858,619 A | 7/1907 | O'Farrell |
| 5,043,876 A | 8/1991 | Terry |

(Continued)

FOREIGN PATENT DOCUMENTS

| CA | 2724521 | 11/2009 |
| CN | 101997924 A | 3/2011 |

(Continued)

OTHER PUBLICATIONS

Exam Report for GB1410569.6 Applicant: Box, Inc. dated Jul. 11, 2014, 9 pages.

(Continued)

*Primary Examiner* — Lewis A Bullock, Jr.
*Assistant Examiner* — Mohammad H Kabir
(74) *Attorney, Agent, or Firm* — Sheridan Ross P.C

(57) ABSTRACT

Systems and methods to automatically upgrade, or update a synchronization client to a cloud-based platform are provided. The automatic upgrading can be provided to a personal or an enterprise-level synchronization client. The synchronization client is implemented in a manner that is silent, secure and fault tolerant. In one embodiment, the disclosed technology includes an executable process to download the update, verify the contents, and apply the update. The contents can be verified by checking the certificate on any binary. The systems and methods further include identification and handling of items to be ignored by the synchronization client for synchronization with a cloud-based platform. In some embodiments, files and folders (Continued)

which typically should not be synchronized are identified and removed from the synchronization process in an effective manner.

19 Claims, 5 Drawing Sheets

(51) Int. Cl.
    *H04L 29/08* (2006.01)
    *G06F 9/445* (2018.01)
    *H04L 29/06* (2006.01)
    *H04W 4/60* (2018.01)

(52) U.S. Cl.
    CPC ............ *H04L 63/123* (2013.01); *H04L 67/10* (2013.01); *H04W 4/60* (2018.02); *H04L 63/0823* (2013.01); *H04L 63/166* (2013.01)

(56) References Cited

U.S. PATENT DOCUMENTS

| | | | |
|---|---|---|---|
| 5,742,905 A | 4/1998 | Pepe et al. |
| 5,748,735 A | 5/1998 | Ganesan |
| 5,774,717 A | 6/1998 | Porcaro |
| 5,787,175 A | 7/1998 | Carter |
| 5,799,320 A | 8/1998 | Klug |
| 5,848,415 A | 12/1998 | Guck |
| 5,864,870 A | 1/1999 | Guck |
| 5,926,816 A | 7/1999 | Bauer et al. |
| 5,999,908 A | 12/1999 | Abelow |
| 6,016,467 A | 1/2000 | Newsted et al. |
| 6,034,621 A | 3/2000 | Kaufman |
| 6,055,543 A | 4/2000 | Christensen et al. |
| 6,073,161 A | 6/2000 | DeBoskey et al. |
| 6,098,078 A | 8/2000 | Gehani et al. |
| 6,226,618 B1 | 5/2001 | Downs et al. |
| 6,233,600 B1 | 5/2001 | Salas et al. |
| 6,260,040 B1 | 7/2001 | Kauffman et al. |
| 6,279,109 B1* | 8/2001 | Brundridge ........... G06F 9/4406 713/2 |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,441,641 B1 | 8/2002 | Pang et al. |
| 6,446,091 B1* | 9/2002 | Noren ................. G06F 11/1435 |
| 6,449,622 B1 | 9/2002 | LaRue et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,636,897 B1 | 10/2003 | Sherman et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,003,667 B1 | 2/2006 | Slick et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,080,104 B2 | 7/2006 | Ring et al. |
| 7,130,831 B2 | 10/2006 | Howard et al. |
| 7,133,834 B1 | 11/2006 | Abelow |
| 7,143,136 B1 | 11/2006 | Drenan et al. |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,171,468 B2 | 1/2007 | Yeung et al. |
| 7,178,021 B1 | 2/2007 | Hanna et al. |
| 7,222,078 B2 | 5/2007 | Abelow |
| 7,233,997 B1 | 6/2007 | Leveridge et al. |
| 7,275,244 B1 | 9/2007 | Charles Bell et al. |
| 7,296,025 B2 | 11/2007 | Kung et al. |
| 7,310,684 B2 | 12/2007 | Patrick et al. |
| 7,337,193 B1 | 2/2008 | Mills et al. |
| 7,346,778 B1 | 3/2008 | Guiter et al. |
| 7,353,252 B1 | 4/2008 | Yang et al. |
| 7,362,868 B2 | 4/2008 | Madoukh et al. |
| 7,363,330 B1 | 4/2008 | Ellman et al. |
| 7,370,269 B1 | 5/2008 | Prabhu et al. |
| 7,380,120 B1 | 5/2008 | Garcia |
| 7,386,535 B1 | 6/2008 | Kalucha et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,650,367 B2 | 1/2010 | Arruza |
| 7,653,668 B1* | 1/2010 | Shelat ................. G06F 11/2094 707/610 |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,735,144 B2 | 6/2010 | Pravetz et al. |
| 7,739,411 B2 | 6/2010 | Messer et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,886,295 B2 | 2/2011 | Burger et al. |
| 7,890,964 B2 | 2/2011 | Vogler-Ivashchanka et al. |
| 7,937,663 B2 | 5/2011 | Parker et al. |
| 7,958,353 B2 | 6/2011 | Matsuzaki et al. |
| 7,958,453 B1 | 6/2011 | Taing |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,126,848 B2 | 2/2012 | Wagner |
| 8,140,513 B2 | 3/2012 | Ghods et al. |
| 8,151,183 B2 | 4/2012 | Chen et al. |
| 8,185,830 B2 | 5/2012 | Saha et al. |
| 8,200,582 B1 | 6/2012 | Zhu |
| 8,201,230 B2 | 6/2012 | Day et al. |
| 8,214,747 B1 | 7/2012 | Yankovich et al. |
| 8,230,348 B2 | 7/2012 | Peters et al. |
| 8,239,918 B1 | 8/2012 | Cohen |
| 8,326,814 B2 | 12/2012 | Ghods et al. |
| 8,347,276 B2 | 1/2013 | Schadow |
| 8,358,701 B2 | 1/2013 | Chou et al. |
| 8,370,803 B1 | 2/2013 | Holler et al. |
| 8,429,540 B1 | 4/2013 | Yankovich et al. |
| 8,447,820 B1 | 5/2013 | Gay |
| 8,458,128 B2 | 6/2013 | Khosravy et al. |
| 8,464,161 B2 | 6/2013 | Giles et al. |
| 8,464,167 B2 | 6/2013 | Saund et al. |
| 8,473,775 B1 | 6/2013 | Helmick et al. |
| 8,515,902 B2 | 8/2013 | Savage |
| 8,527,549 B2 | 9/2013 | Cidon |
| 8,528,087 B2 | 9/2013 | Hsu et al. |
| 8,549,066 B1 | 10/2013 | Donahue et al. |
| 8,549,511 B2 | 10/2013 | Seki et al. |
| 8,572,022 B2 | 10/2013 | Hagan et al. |
| 8,582,777 B2 | 11/2013 | Urivskiy et al. |
| 8,583,619 B2 | 11/2013 | Ghods et al. |
| 8,607,306 B1 | 12/2013 | Bridge et al. |

(56) References Cited

U.S. PATENT DOCUMENTS

| | | | |
|---|---|---|---|
| 8,650,498 B1 | 2/2014 | Mihovilovic | |
| 8,713,098 B1* | 4/2014 | Adya | H04L 63/0807 |
| | | | 707/610 |
| 8,719,445 B2 | 5/2014 | Ko | |
| 8,719,810 B2* | 5/2014 | Oh | G06F 8/658 |
| | | | 717/173 |
| 8,745,267 B2 | 6/2014 | Luecke et al. | |
| 8,782,637 B2 | 7/2014 | Khalid | |
| 8,819,068 B1 | 8/2014 | Knote et al. | |
| 8,825,597 B1 | 9/2014 | Houston et al. | |
| 8,832,493 B2* | 9/2014 | Volvovski | G06F 17/30 |
| | | | 714/6.24 |
| 8,849,955 B2 | 9/2014 | Prahlad et al. | |
| 8,868,574 B1 | 10/2014 | Kiang et al. | |
| 8,869,235 B2 | 10/2014 | Qureshi et al. | |
| 8,886,925 B2 | 11/2014 | Qureshi et al. | |
| 8,892,679 B1 | 11/2014 | Destagnol et al. | |
| 8,914,856 B1 | 12/2014 | Velummylum et al. | |
| 8,914,900 B2 | 12/2014 | Smith et al. | |
| 8,918,387 B1 | 12/2014 | Sokolov | |
| 8,949,179 B2 | 2/2015 | Besen et al. | |
| 8,949,939 B2 | 2/2015 | Peddada | |
| 8,955,103 B2 | 2/2015 | Kline, III et al. | |
| 8,956,103 B2 | 2/2015 | Gehring | |
| 8,959,579 B2 | 2/2015 | Barton et al. | |
| 8,966,062 B1 | 2/2015 | Giese et al. | |
| 8,990,307 B2 | 3/2015 | Barreto et al. | |
| 8,990,955 B2 | 3/2015 | Hymel et al. | |
| 9,015,248 B2 | 4/2015 | Barreto et al. | |
| 9,054,919 B2 | 6/2015 | Kiang et al. | |
| 9,239,846 B2 | 1/2016 | Besen et al. | |
| 9,244,934 B2 | 1/2016 | Besen et al. | |
| 9,268,655 B2 | 2/2016 | Chan et al. | |
| 9,407,664 B1 | 8/2016 | Banerjee | |
| 9,495,434 B1 | 11/2016 | Walton et al. | |
| 9,507,795 B2 | 11/2016 | Dorman et al. | |
| 9,535,924 B2 | 1/2017 | Mackenzie et al. | |
| 9,547,658 B2 | 1/2017 | Fan et al. | |
| 9,553,758 B2 | 1/2017 | Mackenzie et al. | |
| 9,558,202 B2 | 1/2017 | Lockhart et al. | |
| 9,563,517 B1 | 2/2017 | Natanzon et al. | |
| 9,575,981 B2 | 2/2017 | Dorman et al. | |
| 9,633,037 B2 | 4/2017 | Smith et al. | |
| 9,652,741 B2 | 5/2017 | Goldberg et al. | |
| 9,773,051 B2 | 9/2017 | Smith | |
| 2001/0027492 A1 | 10/2001 | Gupta | |
| 2002/0029218 A1 | 3/2002 | Bentley et al. | |
| 2002/0091738 A1 | 7/2002 | Rohrabaugh et al. | |
| 2002/0099772 A1 | 7/2002 | Deshpande et al. | |
| 2002/0116544 A1 | 8/2002 | Barnard et al. | |
| 2002/0133509 A1 | 9/2002 | Johnston et al. | |
| 2002/0147770 A1 | 10/2002 | Tang | |
| 2002/0194177 A1* | 12/2002 | Sherman | G06F 17/30578 |
| 2002/0199024 A1* | 12/2002 | Givoly | G06Q 30/02 |
| | | | 709/248 |
| 2003/0041095 A1 | 2/2003 | Konda et al. | |
| 2003/0073448 A1 | 4/2003 | Ozeki et al. | |
| 2003/0084306 A1 | 5/2003 | Abburi et al. | |
| 2003/0093404 A1 | 5/2003 | Bader et al. | |
| 2003/0097374 A1 | 5/2003 | Himeno | |
| 2003/0108052 A1 | 6/2003 | Inoue et al. | |
| 2003/0110264 A1 | 6/2003 | Whidby et al. | |
| 2003/0115326 A1 | 6/2003 | Verma et al. | |
| 2003/0135536 A1 | 7/2003 | Lyons | |
| 2003/0135565 A1 | 7/2003 | Estrada | |
| 2003/0154306 A1 | 8/2003 | Perry | |
| 2003/0204490 A1 | 10/2003 | Kasriel | |
| 2003/0217171 A1 | 11/2003 | Von Stuermer et al. | |
| 2003/0228015 A1 | 12/2003 | Futa et al. | |
| 2004/0003104 A1 | 1/2004 | Boskovic et al. | |
| 2004/0021686 A1 | 2/2004 | Barberis | |
| 2004/0076187 A1 | 4/2004 | Peled | |
| 2004/0088647 A1 | 5/2004 | Miller et al. | |
| 2004/0098361 A1 | 5/2004 | Peng | |
| 2004/0103147 A1 | 5/2004 | Flesher et al. | |
| 2004/0111415 A1 | 6/2004 | Scardino et al. | |
| 2004/0117438 A1 | 6/2004 | Considine et al. | |
| 2004/0122949 A1 | 6/2004 | Zmudzinski et al. | |
| 2004/0128359 A1 | 7/2004 | Horvitz et al. | |
| 2004/0162836 A1 | 8/2004 | Aronoff et al. | |
| 2004/0177138 A1 | 9/2004 | Salle et al. | |
| 2004/0181579 A1 | 9/2004 | Huck et al. | |
| 2004/0196307 A1 | 10/2004 | Zak et al. | |
| 2004/0201604 A1 | 10/2004 | Kraenzel et al. | |
| 2004/0218214 A1 | 11/2004 | Kihara et al. | |
| 2004/0230624 A1 | 11/2004 | Frolund et al. | |
| 2004/0230652 A1 | 11/2004 | Estrada et al. | |
| 2004/0246532 A1 | 12/2004 | Inada | |
| 2004/0260977 A1 | 12/2004 | Ji et al. | |
| 2004/0267825 A1 | 12/2004 | Novak et al. | |
| 2004/0267836 A1 | 12/2004 | Armangau et al. | |
| 2005/0005276 A1 | 1/2005 | Morgan | |
| 2005/0010860 A1 | 1/2005 | Weiss et al. | |
| 2005/0022175 A1* | 1/2005 | Sliger | G06F 8/658 |
| | | | 717/169 |
| 2005/0022229 A1 | 1/2005 | Gabriel et al. | |
| 2005/0028006 A1 | 2/2005 | Leser et al. | |
| 2005/0033777 A1 | 2/2005 | Moraes et al. | |
| 2005/0038831 A1 | 2/2005 | Souder et al. | |
| 2005/0038997 A1 | 2/2005 | Kojima et al. | |
| 2005/0050073 A1 | 3/2005 | Demiroski et al. | |
| 2005/0050228 A1 | 3/2005 | Perham et al. | |
| 2005/0055306 A1 | 3/2005 | Miller et al. | |
| 2005/0063083 A1 | 3/2005 | Dart et al. | |
| 2005/0097225 A1 | 5/2005 | Glatt et al. | |
| 2005/0097434 A1 | 5/2005 | Storisteanu | |
| 2005/0102328 A1 | 5/2005 | Ring et al. | |
| 2005/0108406 A1 | 5/2005 | Lee et al. | |
| 2005/0114305 A1 | 5/2005 | Haynes et al. | |
| 2005/0114378 A1 | 5/2005 | Elien et al. | |
| 2005/0138118 A1 | 6/2005 | Banatwala et al. | |
| 2005/0172284 A1* | 8/2005 | Dandekar | G06F 8/61 |
| | | | 717/175 |
| 2005/0182966 A1 | 8/2005 | Pham et al. | |
| 2005/0198299 A1 | 9/2005 | Beck et al. | |
| 2005/0198452 A1 | 9/2005 | Watanabe | |
| 2005/0223047 A1 | 10/2005 | Shah et al. | |
| 2005/0234864 A1 | 10/2005 | Shapiro | |
| 2005/0234943 A1 | 10/2005 | Clarke | |
| 2005/0261933 A1 | 11/2005 | Magnuson | |
| 2006/0005163 A1 | 1/2006 | Huesken et al. | |
| 2006/0026502 A1 | 2/2006 | Dutta | |
| 2006/0026535 A1 | 2/2006 | Hotelling et al. | |
| 2006/0036568 A1 | 2/2006 | Moore et al. | |
| 2006/0041603 A1 | 2/2006 | Paterson et al. | |
| 2006/0041752 A1 | 2/2006 | Tuvell et al. | |
| 2006/0047804 A1 | 3/2006 | Fredricksen et al. | |
| 2006/0053088 A1 | 3/2006 | Ali et al. | |
| 2006/0053380 A1 | 3/2006 | Spataro et al. | |
| 2006/0070083 A1 | 3/2006 | Brunswig et al. | |
| 2006/0075071 A1 | 4/2006 | Gillette | |
| 2006/0117247 A1 | 6/2006 | Fite et al. | |
| 2006/0123062 A1 | 6/2006 | Bobbitt et al. | |
| 2006/0133340 A1 | 6/2006 | Rybak et al. | |
| 2006/0168550 A1 | 7/2006 | Muller et al. | |
| 2006/0173952 A1 | 8/2006 | Coyle | |
| 2006/0174051 A1 | 8/2006 | Lordi et al. | |
| 2006/0174054 A1 | 8/2006 | Matsuki | |
| 2006/0179070 A1 | 8/2006 | George et al. | |
| 2006/0179309 A1 | 8/2006 | Cross et al. | |
| 2006/0242204 A1 | 10/2006 | Karas et al. | |
| 2006/0242206 A1 | 10/2006 | Brezak et al. | |
| 2006/0259524 A1 | 11/2006 | Horton | |
| 2006/0265719 A1 | 11/2006 | Astl et al. | |
| 2006/0271510 A1 | 11/2006 | Harward et al. | |
| 2006/0288043 A1 | 12/2006 | Novak et al. | |
| 2007/0011469 A1 | 1/2007 | Allison et al. | |
| 2007/0016680 A1 | 1/2007 | Burd et al. | |
| 2007/0028291 A1 | 2/2007 | Brennan et al. | |
| 2007/0038934 A1 | 2/2007 | Fellman | |
| 2007/0067349 A1 | 3/2007 | Jhaveri et al. | |
| 2007/0079242 A1 | 4/2007 | Jolley et al. | |
| 2007/0100830 A1 | 5/2007 | Beedubail et al. | |
| 2007/0115845 A1 | 5/2007 | Hochwarth et al. | |

(56) References Cited

U.S. PATENT DOCUMENTS

| | | |
|---|---|---|
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0142039 A1 | 6/2007 | Bushnell et al. |
| 2007/0157203 A1 | 7/2007 | Lim |
| 2007/0162610 A1 | 7/2007 | Un et al. |
| 2007/0179993 A1 | 8/2007 | Arruza |
| 2007/0185885 A1 | 8/2007 | Tamura |
| 2007/0195779 A1 | 8/2007 | Judge et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0040560 A1 | 2/2008 | Hall et al. |
| 2008/0046828 A1 | 2/2008 | Bibliowicz et al. |
| 2008/0059474 A1 | 3/2008 | Lim |
| 2008/0059656 A1 | 3/2008 | Saliba et al. |
| 2008/0060080 A1 | 3/2008 | Lim |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0195673 A1 | 8/2008 | Hamel et al. |
| 2008/0215883 A1 | 9/2008 | Fok et al. |
| 2008/0222654 A1 | 9/2008 | Xu et al. |
| 2008/0243846 A1 | 10/2008 | Rasmussen |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2008/0281972 A1 | 11/2008 | Gupta et al. |
| 2008/0294899 A1 | 11/2008 | Gazzetta et al. |
| 2008/0306900 A1 | 12/2008 | Tamura |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0043848 A1 | 2/2009 | Kordun |
| 2009/0044128 A1 | 2/2009 | Baumgarten et al. |
| 2009/0049131 A1 | 2/2009 | Lyle et al. |
| 2009/0097374 A1 | 4/2009 | Shoji et al. |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0158142 A1* | 6/2009 | Arthursson ......... G06F 9/45504 715/255 |
| 2009/0164438 A1 | 6/2009 | Delacruz |
| 2009/0171983 A1 | 7/2009 | Samji et al. |
| 2009/0172201 A1 | 7/2009 | Carmel |
| 2009/0177754 A1 | 7/2009 | Brezina et al. |
| 2009/0182989 A1* | 7/2009 | Rosenbluth ......... G06F 9/30098 712/220 |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0265430 A1 | 10/2009 | Bechtel et al. |
| 2009/0271708 A1 | 10/2009 | Peters et al. |
| 2009/0276660 A1* | 11/2009 | Griffith ............... G06F 11/1438 714/16 |
| 2009/0276771 A1 | 11/2009 | Nickolov et al. |
| 2009/0282212 A1 | 11/2009 | Peterson |
| 2009/0282483 A1 | 11/2009 | Bennett |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327405 A1 | 12/2009 | FitzGerald et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0017619 A1 | 1/2010 | Errico |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082396 A1 | 4/2010 | Caldwell et al. |
| 2010/0082534 A1 | 4/2010 | Sagar et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0122184 A1 | 5/2010 | Vonog et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0154025 A1 | 6/2010 | Esteve Balducci et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205392 A1 | 8/2010 | Schnapp et al. |
| 2010/0205537 A1 | 8/2010 | Knighton et al. |
| 2010/0212010 A1* | 8/2010 | Stringer ................ G06F 21/52 726/22 |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0242028 A1* | 9/2010 | Weigert ................ G06F 21/105 717/131 |
| 2010/0250120 A1 | 9/2010 | Waupotitsch et al. |

(56) References Cited

U.S. PATENT DOCUMENTS

| | | |
|---|---|---|
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0262953 A1 | 10/2010 | Barboni et al. |
| 2010/0267588 A1 | 10/2010 | Nelson et al. |
| 2010/0269164 A1 | 10/2010 | Sosnosky et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0293147 A1* | 11/2010 | Snow ............... G06F 17/30067 707/640 |
| 2010/0306379 A1 | 12/2010 | Ferris |
| 2010/0312615 A1 | 12/2010 | Murphy et al. |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332818 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1* | 2/2011 | McGill ............... G06F 11/1662 714/15 |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0078243 A1 | 3/2011 | Carpenter et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0099212 A1 | 4/2011 | Hahn et al. |
| 2011/0107088 A1 | 5/2011 | Eng et al. |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0125847 A1 | 5/2011 | Cocheu et al. |
| 2011/0131299 A1 | 6/2011 | Sardary |
| 2011/0137991 A1 | 6/2011 | Russell |
| 2011/0138479 A1 | 6/2011 | Jain et al. |
| 2011/0142410 A1 | 6/2011 | Ishii |
| 2011/0145187 A1 | 6/2011 | Himmelsbach et al. |
| 2011/0145282 A1 | 6/2011 | Moore et al. |
| 2011/0145589 A1 | 6/2011 | Camenisch et al. |
| 2011/0145744 A1 | 6/2011 | Haynes et al. |
| 2011/0154180 A1 | 6/2011 | Evanitsky et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0218964 A1 | 9/2011 | Hagan et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252312 A1 | 10/2011 | Lemonik et al. |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0264621 A1 | 10/2011 | Burjoski |
| 2011/0276683 A1 | 11/2011 | Goldschlag et al. |
| 2011/0277027 A1 | 11/2011 | Hayton et al. |
| 2011/0282710 A1 | 11/2011 | Akkiraju et al. |
| 2011/0289433 A1 | 11/2011 | Whalin et al. |
| 2011/0295798 A1 | 12/2011 | Shain |
| 2011/0296022 A1 | 12/2011 | Ferris et al. |
| 2011/0302571 A1* | 12/2011 | O'Farrell ............... G06F 16/27 717/170 |
| 2011/0313803 A1 | 12/2011 | Friend et al. |
| 2011/0314145 A1 | 12/2011 | Raleigh et al. |
| 2011/0320197 A1 | 12/2011 | Conejero et al. |
| 2011/0320936 A1 | 12/2011 | Mohan et al. |
| 2012/0030187 A1 | 2/2012 | Marano et al. |
| 2012/0057696 A1 | 3/2012 | Chew |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089610 A1 | 4/2012 | Agrawal et al. |
| 2012/0089659 A1 | 4/2012 | Halevi et al. |
| 2012/0089710 A1 | 4/2012 | Rakowski et al. |
| 2012/0096521 A1 | 4/2012 | Peddada |
| 2012/0101995 A1 | 4/2012 | Agetsuma et al. |
| 2012/0108200 A1 | 5/2012 | Rubin et al. |
| 2012/0110005 A1 | 5/2012 | Kuo et al. |
| 2012/0110436 A1 | 5/2012 | Adler et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0143825 A1 | 6/2012 | Boehm et al. |
| 2012/0144283 A1 | 6/2012 | Hill et al. |
| 2012/0150888 A1 | 6/2012 | Hyatt et al. |
| 2012/0151265 A1 | 6/2012 | Bender et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0166516 A1 | 6/2012 | Simmons et al. |
| 2012/0173612 A1 | 7/2012 | Vegesna-Venkata et al. |
| 2012/0173625 A1 | 7/2012 | Berger |
| 2012/0179802 A1* | 7/2012 | Narasimhan .......... H04L 41/046 709/223 |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203670 A1 | 8/2012 | Piersol |
| 2012/0203908 A1 | 8/2012 | Beaty et al. |
| 2012/0204032 A1 | 8/2012 | Wilkins et al. |
| 2012/0206653 A1 | 8/2012 | Graves et al. |
| 2012/0207449 A1 | 8/2012 | Angquist et al. |
| 2012/0209815 A1 | 8/2012 | Carson et al. |
| 2012/0209889 A1 | 8/2012 | Agnoli et al. |
| 2012/0214444 A1 | 8/2012 | McBride et al. |
| 2012/0216242 A1 | 8/2012 | Uner et al. |
| 2012/0218885 A1 | 8/2012 | Abel et al. |
| 2012/0221789 A1 | 8/2012 | Felter |
| 2012/0224691 A1 | 9/2012 | Purohit |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |

(56) References Cited

U.S. PATENT DOCUMENTS

| | | |
|---|---|---|
| 2012/0240183 A1 | 9/2012 | Sinha |
| 2012/0257249 A1 | 10/2012 | Natarajan |
| 2012/0259964 A1 | 10/2012 | Lin et al. |
| 2012/0263166 A1 | 10/2012 | Cho et al. |
| 2012/0266203 A1 | 10/2012 | Elhadad et al. |
| 2012/0284290 A1 | 11/2012 | Keebler et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0311499 A1 | 12/2012 | Dellinger et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0054634 A1 | 2/2013 | Chakraborty et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0073621 A1 | 3/2013 | Waddoups et al. |
| 2013/0080765 A1* | 3/2013 | Mohanty ............ H04L 63/0428 713/150 |
| 2013/0080919 A1 | 3/2013 | Kiang et al. |
| 2013/0110565 A1 | 5/2013 | Means, Jr. et al. |
| 2013/0110961 A1 | 5/2013 | Jadhav |
| 2013/0117226 A1 | 5/2013 | Jain et al. |
| 2013/0117337 A1 | 5/2013 | Dunham |
| 2013/0117376 A1 | 5/2013 | Filman et al. |
| 2013/0124458 A1 | 5/2013 | Barreto et al. |
| 2013/0124638 A1 | 5/2013 | Barreto et al. |
| 2013/0124984 A1 | 5/2013 | Kuspa |
| 2013/0138608 A1 | 5/2013 | Smith |
| 2013/0138615 A1 | 5/2013 | Gupta et al. |
| 2013/0151690 A1 | 6/2013 | Shah et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0179947 A1 | 7/2013 | Kline, III et al. |
| 2013/0185347 A1 | 7/2013 | Romano |
| 2013/0185452 A1 | 7/2013 | Burckart et al. |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212067 A1 | 8/2013 | Piasecki et al. |
| 2013/0212486 A1 | 8/2013 | Joshi et al. |
| 2013/0218978 A1 | 8/2013 | Weinstein et al. |
| 2013/0219176 A1 | 8/2013 | Akella et al. |
| 2013/0226876 A1 | 8/2013 | Gati et al. |
| 2013/0227522 A1 | 8/2013 | Lerum et al. |
| 2013/0239049 A1 | 9/2013 | Perrodin et al. |
| 2013/0246901 A1 | 9/2013 | Massand |
| 2013/0246932 A1 | 9/2013 | Zaveri et al. |
| 2013/0254699 A1 | 9/2013 | Bashir et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0268999 A1 | 10/2013 | Kiang et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0282658 A1 | 10/2013 | Besen et al. |
| 2013/0282830 A1 | 10/2013 | Besen et al. |
| 2013/0283106 A1 | 10/2013 | King et al. |
| 2013/0304679 A1 | 11/2013 | Fleming et al. |
| 2013/0304694 A1 | 11/2013 | Barreto et al. |
| 2013/0304697 A1 | 11/2013 | Movida |
| 2013/0305039 A1 | 11/2013 | Gauda |
| 2013/0325803 A1 | 12/2013 | Akirav et al. |
| 2013/0326344 A1 | 12/2013 | Masselle et al. |
| 2014/0006357 A1 | 1/2014 | Davis et al. |
| 2014/0006465 A1 | 1/2014 | Davis et al. |
| 2014/0007205 A1 | 1/2014 | Oikonomou |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0033324 A1 | 1/2014 | Kiang et al. |
| 2014/0040182 A1* | 2/2014 | Gilder ............... G06F 17/30578 707/602 |
| 2014/0040206 A1 | 2/2014 | Ramakrishnan et al. |
| 2014/0047509 A1 | 2/2014 | Bhogal et al. |
| 2014/0052939 A1 | 2/2014 | Tseng et al. |
| 2014/0059002 A1 | 2/2014 | Lockhart et al. |
| 2014/0059217 A1 | 2/2014 | Pizurica |
| 2014/0068589 A1 | 3/2014 | Barak |
| 2014/0074629 A1 | 3/2014 | Rathod |
| 2014/0082071 A1 | 3/2014 | Rexer |
| 2014/0149461 A1 | 5/2014 | Wijayaratne et al. |
| 2014/0150023 A1 | 5/2014 | Gudorf et al. |
| 2014/0156373 A1 | 6/2014 | Roberts et al. |
| 2014/0172595 A1 | 6/2014 | Beddow et al. |
| 2014/0172783 A1* | 6/2014 | Suzuki ..................... G06F 8/63 707/609 |
| 2014/0172799 A1 | 6/2014 | Dorman |
| 2014/0188798 A1 | 7/2014 | Mackenzie et al. |
| 2014/0195485 A1 | 7/2014 | Dorman |
| 2014/0201138 A1 | 7/2014 | Dorman et al. |
| 2014/0201145 A1 | 7/2014 | Dorman et al. |
| 2014/0215303 A1 | 7/2014 | Grigorovitch et al. |
| 2014/0230011 A1 | 8/2014 | Drewry et al. |
| 2014/0244600 A1* | 8/2014 | Schmidt ............ G06F 17/30156 707/692 |
| 2014/0258350 A1 | 9/2014 | Duval et al. |
| 2014/0280605 A1* | 9/2014 | Zhang ................. H04L 67/1095 709/205 |
| 2014/0337291 A1 | 11/2014 | Dorman et al. |
| 2014/0337482 A1 | 11/2014 | Houston et al. |
| 2014/0337491 A1 | 11/2014 | Barreto et al. |
| 2014/0344456 A1 | 11/2014 | Buzbee et al. |
| 2014/0359085 A1 | 12/2014 | Chen |
| 2014/0359286 A1 | 12/2014 | Wen et al. |
| 2014/0372376 A1 | 12/2014 | Smith et al. |
| 2014/0379647 A1 | 12/2014 | Smith et al. |
| 2014/0379760 A1 | 12/2014 | Martin et al. |
| 2015/0019723 A1 | 1/2015 | Kweon et al. |
| 2015/0039556 A1 | 2/2015 | Mackenzie et al. |
| 2015/0154156 A1 | 6/2015 | Meyers, Jr. et al. |
| 2015/0186668 A1* | 7/2015 | Whaley ............... G06F 21/6218 713/156 |
| 2015/0237406 A1 | 8/2015 | Ochoa et al. |
| 2016/0065672 A1 | 3/2016 | Savage et al. |
| 2016/0350326 A1 | 12/2016 | Simonetti |
| 2017/0220596 A1 | 8/2017 | Smith et al. |
| 2018/0004831 A1 | 1/2018 | Smith |
| 2018/0046644 A1 | 2/2018 | Benjamin et al. |

FOREIGN PATENT DOCUMENTS

| | | |
|---|---|---|
| CN | 102264063 A | 11/2011 |
| EP | 0348614 A2 | 1/1990 |
| EP | 0921661 A2 | 6/1999 |
| EP | 1349088 | 10/2003 |
| EP | 1528746 A2 | 5/2005 |
| EP | 1933242 A1 | 6/2008 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |

(56) References Cited

FOREIGN PATENT DOCUMENTS

| | | |
|---|---|---|
| JP | 2003273912 A | 9/2003 |
| JP | 2004310272 A | 11/2004 |
| JP | 09-269925 | 10/2007 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-2002019128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 A1 | 11/2013 |

OTHER PUBLICATIONS

Sommerer, "Presentable Document Format: Improved On-demand PDF to HTML Conversion," retrieved from the internet, http://research.microsoft.com, Nov. 2004, 8 pages.

Extended Search Report for EP131832800, Applicant: Box, Inc. dated Aug. 25, 2014, 7 pages.

Extended Search Report for EP141509422, Applicant: Box, Inc. dated Aug. 26, 2014, 12pages.

Search Report for EP 13189144.2 Applicant: Box, Inc. dated Sep. 1, 2014, 9 pages.

Exam Report for GB1312874.9 Applicant: Box, Inc. dated Sep. 26, 2014, 2 pages.

Exam Report for GB1415126.0 Applicant: Box, Inc. dated Oct. 2, 2014, 8 pages.

Exam Report for GB1415314.2 Applicant: Box, Inc. dated Oct. 7, 2014, 6 pages.

Exam Report for GB1309209.3 Applicant: Box, Inc. dated Oct. 7, 2014, 3 pages.

Exam Report for GB1315232.7 Applicant: Box, Inc. dated Oct. 9, 2014, 5 pages.

Exam Report for GB1318789.3 Applicant: Box, Inc. dated Oct. 30, 2014, 6 pages.

Microsoft Windows XP Professional Product Documentation: How Inheritance Affects File and Folder Permissions, Apr. 11, 2014, 2 pages.

"Average Conversion Time for a D60 RAW file?" http://www.dpreview.com, Jul. 22, 2002, 4 pages.

"Conceptboard", One-Step Solution for Online Collaboration, retrieved from websites http://conceptboard.com and https://www.youtube.com/user/ConceptboardApp?feature=watch, printed on Jun. 13, 2013, 9 pages.

"How-to Geek, How to Sync Specific Folders With Dropbox," downloaded from the internet http://www.howtogeek.com, Apr. 23, 2013, 5 pages.

"Microsoft Office SharePoint 2007 User Guide," Feb. 16, 2010, pp. 1-48.

"PaperPort Professional 14," PC Mag. Com review, published Feb. 2012, Ziff Davis, Inc., 8 pages.

"PaperPort," Wikipedia article (old revision), published May 19, 2012, Wikipedia Foundation, 2 pages.

"Quickoffice Enhances Android Mobile office Application for Improved Productivity on latest Smartphone and Table Devices," QuickOffice Press Release, Nov. 21, 2011, QuickOffice Inc., 2 pages.

"QuickOffice," Wikipedia Article (old revision), published May 9, 2012, Wikipedia Foundation, 2 pages.

"Revolving sync conflicts; frequently asked questions," Microsoft Tech Support, Jul. 16, 2012, retrieved from the Internet: http://web.archive.org/web, 2 pages.

"Troubleshoot sync problems," Microsoft Tech Support: May 2, 2012, retrieved from the Internet, http://web. Archive.org/web, 3 pages.

"Tulsa TechFest 2012—Agenda," retrieved from the website, http://web.archive.org, Oct. 2, 2012, 2 pages.

"Understanding Metadata," National Information Standards Organization, NISO Press, 2004, 20 pages.

Burns, "Developing Secure Mobile Applications for Android," Oct. 2008, Version 1.0, 1-28 pages.

Cisco, "FTP Load Balancing on ACE in Routed Mode Configuration Example," DocWiki, Jun. 2011, 7 pages.

Cohen, "Debating the Definition of Cloud Computing Platforms," retrieved from the internet, http://forbes.com, Feb. 3, 2014, 7 pages.

Comes, "MediaXchange User's Manual," Version 1.15.15, Feb. 1, 2009, pp. 1-90.

Conner, "Google Apps: The Missing Manual," published by O'Reilly Media, May 27, 2008, 24 pages.

Delendik, "Evolving with Web Standards—The Story of PDF.JS," retrieved from the internet, http://people.mozilla.org, Oct. 12, 2012, 36 pages.

Delendik, "My PDF.js talk slides from Tulsa TechFest," retrieved from the internet, http://twitter.com, Oct. 12, 2012, 2 pages.

Duffy, "The Best File-Syncing Services," pcmag.com, retrieved from the internet: http://www.pcmag.com, Sep. 28, 2012, 7 pages.

Exam Report for EP13158415.3, Applicant: Box, Inc. dated Jun. 4, 2013, 8 pages.

Exam Report for EP13168784.0, Applicant: Box, Inc. dated Nov. 21, 2013, 7 pages.

Exam Report for EP13177108.1, Applicant: Box, Inc. dated May 26, 2014, 6 pages.

Exam Report for EP13185269.1, Applicant: Box, Inc. dated Jan. 28, 7 pages.

Exam Report for GB1300188.8, Applicant: Box, Inc. dated May 31, 2013, 8 pages.

Exam Report for GB1306011.6, Applicant: Box, Inc. dated Apr. 18, 2013, 8 pages.

Exam Report for GB1308842.2, Applicant: Box, Inc. dated Mar. 10, 2014, 4 pages.

Exam Report for GB1309209.3, Applicant: Box, Inc. dated Oct. 30, 2013, 11 pages.

Exam Report for GB1310666.1, Applicant: Box, Inc. dated Aug. 30, 2013, 10 pages.

Exam Report for GB1311417.8, Applicant: Box, Inc. dated Dec. 23, 2013, 5 pages.

Exam Report for GB1312095.1, Applicant: Box, Inc. dated Dec. 12, 2013, 7 pages.

Exam Report for GB1312264.3, Applicant: Box, Inc. dated Mar. 24, 2014, 7 pages.

Exam Report for GB1312874.9, Applicant: Box, Inc. dated Dec. 20, 2013, 11 pages.

Exam Report for GB1313559.5, Applicant: Box, Inc., dated Aug. 22, 2013, 19 pages.

Exam Report for GB1314771.5, Applicant: Box, Inc. dated Feb. 17, 2014, 7 pages.

Exam Report for GB1316532.9, Applicant: Box, Inc. dated Oct. 31, 2013, 10 pages.

Exam Report for GB1316533.7, Applicant: Box, Inc. dated Oct. 8, 2013, 9 pages.

Exam Report for GB1316971.9, Applicant: Box, Inc. dated Nov. 26, 2013, 10 pages.

Exam Report for GB1317600.3, Applicant: Box, Inc. dated Nov. 21, 2013, 8 pages.

Exam Report for GB1318373.6, Applicant: Box, Inc. dated Dec. 17, 2013, 4 pages.

(56) References Cited

OTHER PUBLICATIONS

Exam Report for GB1318792.7, Applicant: Box, Inc. dated May 22, 2014, 2 pages.
Exam Report for GB1320902.8, Applicant: Box, Inc. dated Dec. 20, 2013, 6 pages.
Gedymin, "Cloud computing with an emphasis on Google App Engine," Master Final Project, Sep. 2011, 146 pages.
Google Docs, http://web. Archive.org/web/20100413105758/http://en.wikipedia.org/wiki/Google_docs, Apr. 13, 2010, 6 pages.
International Search Report and Written Opinion for PCT/US2008/012973 dated Apr. 30, 2009, pp. 1-11.
International Search Report and Written Opinion for PCT/US2011/039126 dated Oct. 6, 2011, pp. 1-13.
International Search Report and Written Opinion for PCT/US2011/047530, Applicant: Box, Inc., dated Mar. 22, 2013, pp.1-10.
International Search Report and Written Opinion for PCT/US2011/056472 dated Jun. 22, 2012, pp. 1-12.
International Search Report and Written Opinion for PCT/US2011/057938, Applicant: Box, Inc., dated Mar. 29, 2013, 10 pages.
International Search Report and Written Opinion for PCT/US2011/060875 dated Oct. 30, 2012, pp. 1-10.
International Search Report and Written Opinion for PCT/US2012/056955, Applicant: Box, Inc., dated Mar. 27, 2013, pp. 1-11.
International Search Report and Written Opinion for PCT/US2012/063041, Applicant: Box, Inc., dated Mar. 29, 2013, 12 pages.
International Search Report and Written Opinion for PCT/US2012/065617, Applicant: Box, Inc., dated Mar. 29, 2013, 9 pages.
International Search Report and Written Opinion for PCT/US2012/067126, Applicant: Box, Inc., dated Mar. 29, 2013, 10 pages.
International Search Report and Written Opinion for PCT/US2012/070366, Applicant: Box, Inc., dated Apr. 24, 2013, 10 pages.
International Search Report and Written Opinion for PCT/US2013/020267, Applicant: Box, Inc., dated May 7, 2013, 10 pages.
International Search Report and Written Opinion for PCT/US2013/023889, Applicant: Box, Inc., dated Jun. 24, 2013, 13 pages.
International Search Report and Written Opinion for PCT/US2013/029520, Applicant: Box, Inc., dated Jun. 26, 2013, 10 pages.
International Search Report and Written Opinion for PCT/US2013/034662, Applicant: Box, Inc., dated May 31, 2013, 10 pages.
International Search Report and Written Opinion for PCT/US2013/034765, Applicant: Box, Inc., dated Jan. 20, 2014, 15 pages.
International Search Report and Written Opinion for PCT/US2013/035404, Applicant: Box, Inc., dated Jun. 26, 2013, 11 pages.
International Search Report and Written Opinion for PCT/US2013/039782, Applicant: Box, Inc., dated Aug. 28, 2013, 15 pages.
Internet Forums, http://web.archive.org/web/20100528195550/http://en.wikipedia.org/wiki/Internet_forums, Wikipedia, May 30, 2010, pp. 1-20.
John et al., "Always Sync Support Forums—View topic—Allway sync funny behavior," Allway Sync Support Forum at http://sync-center.com, Mar. 28, 2011, XP055109680, 2 pages.
Langfeld L. et al., "Microsoft SharePoint 2003 Unleashed," Chapters 11 and 15, Jun. 2004, pp. 403-404, 557-561, 578-581.
Lars, "35 Very Useful Online Tools for Improving your project Management and Team Collaboration," Apr. 31, 2010, tripwiremagazine.com, pp. 1-32.
Palmer, "Load Balancing FTP Servers," BlogNav, Oct. 2008, 2 pages.
Parr, "Google Docs Improves Commenting, Adds E-mail Notifications," Apr. 16, 2011, mashable.com, pp. 1-6.
Partial International Search Report for PCT/US2011/041308 dated Feb. 27, 2012, pp. 1-2.
Partial Search Report for EP131832800, Applicant: Box, Inc. dated May 8, 2014, 5 pages.
Patent Court Document of Approved Judgment for GB0602349.3 and GB0623571.7; Mar. 3, 2009, 17 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP13187217.8, Applicant: Box, Inc. dated Apr. 15, 2014, 12 pages.
Search Report for EP141509422, Applicant: Box, Inc. dated May 8, 2014, 7 pages.
Search Report for EP14151588.2, Applicant: Box, Inc. dated Apr. 15, 2014, 12 pages.
Search Report for EP14153783.7, Applicant: Box, Inc. dated Apr. 3, 2014, 6 pages.
Sommerer, "Presentable Document Format: Improved On-demand PDF to HTML Conversion," retrieved from the internet, http://research.microsoft.com, 8 pages.
Supplementary European Search Report European Application No. EP 08 85 8563 dated Jun. 20, 2011 pp. 1-5.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.
Exam Report for GB1317393.5 Applicant: Box, Inc. dated Nov. 7, 2014, 6 pages.
Exam Report for GB1311417.8 Applicant: Box, Inc. dated Nov. 7, 2014, 2 pages.
Exam Report for GB1311421.0 Applicant: Box, Inc. dated Nov. 7, 2014, 4 pages.
Exam Report for GB1316682.2 Applicant: Box, Inc. dated Nov. 19, 2014, 6 pages.
Exam Report for GB1312095.1 Applicant: Box, Inc. dated Nov. 19, 2014, 5 pages.
Exam Report for GB1313559.5 Applicant: Box, Inc. dated Nov. 4, 2014, 2 pages.
User's Guide for Smart Board Software for Windows, published Dec. 2004, 90 pages.
Zambonini et al., "Automated Measuring of Interaction with User Interfaces," Published as WO2007113573 Oct. 2007, 19 pages.
Exam Report for GB1309209.3 Applicant: Box, Inc. dated Jan. 19, 2015, 6 pages.
"Agilewords—How to Request Approval," YouTube, http://www.youtube.com/watch?v=3-Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.
Exam Report for EP 13177108.1, Applicant: Box, Inc. dated Feb. 17, 2015, 6 pages.
Exam Report for GB1312264.3 Applicant: Box, Inc. dated Jan. 30, 2015, 5 pages.
Exam Report for GB1312874.9 Applicant: Box, Inc. dated Feb. 10, 2015, 7 pages.
Exam Report for GB1316685.5 Applicant: Box, Inc. dated Feb. 17, 2015, 5 pages.
Exam Report for EP 13185269.1, Applicant: Box, Inc. dated Feb. 13, 2015, 8 pages.
Exam Report for GB1316532.9 Applicant: Box, Inc. dated Mar. 27, 2015, 6 pages.
Burney, "How to Move Document from Your Computer to Your iPad and Back Again," May 31, 2011, 3 pages.
Exam Report for GB1311459.0 Applicant: Box, Inc. dated Aug. 19, 2013, 6 pages.
"Dropbox: Sync only specific folders," posted on Feb. 9, 2012, available online at http://www.tech-recipes.com/rx/20865/dropbox-sync-only-specific-folders/, 4 pages.
Exam Report for GB1220644.7 Applicant: Box, Inc. dated May 1, 2015, 4 pages.

(56) References Cited

OTHER PUBLICATIONS

Invens, "Using and Troubleshooting Offline Files," Jun. 23, 2002, Windows IT Pro, pp. 1-5.
Invens, "Using and Troubleshooting Offline Files," Jun. 23, 2002, Windows IT Pro, Figures 1 and 2, 2 pages.
"How-to Geek, How to Sync Specific Folders With Dropbox," originally written on Jun. 1, 2010 and archived version retrieved from WaybackMachine as published online on Jul. 4, 2014 at http://www.howtogeek.com/howto/18285/sync-specific-folders-with-dropbox, 5 pages.
Exam Report for GB1413461.3; Applicant: Box, Inc. dated Aug. 21, 2015, 6 pages.
Fu et al., "Efficient and Fine-Grained Sharing of Encrypted Files," Quality of Service (IWQos), 2010 18th International Workshop on year 2010, pp. 1-2.
Ivens, "Using and Troubleshooting Offline Files," Jun. 23, 2002, Windows IT Pro, Figure 1.
Ivens, "Configuring Offline Files," Apr. 21, 2002, Windows IT Pro, pp. 1-5.
Exam Report for GB1316532.9; Applicant: Box, Inc., dated Mar. 8, 2016, 3 pages.
Cicnavi, "Offline Files in XP," Nov. 29, 2010, UtilizeWindows, pp. 1-6.
Kretzschmar et al., "Functional Components for a Security Manager within Future Inter-Cloud environments," Copyright 2011 IEEE, 5 pages.
Li et al., "CloudVO: Building a Secure Virtual Organization for Multiple Clouds Collaboration," Copyright 2010 IEEE, 6 pages.
Mont et al., "Risk Assessment and Decision Support for Security Policies and Related Enterprise Operational Processes," Copyright 2011 IEEE, 4 pages.
TaheriMonfared et al., "Monitoring Intrusions and Security Breaches in Highly Distributed Cloud Environments," Copyright 2011 IEEE, 6 pages.
Vimercati et al., "Managing and Accessing Data in the Cloud: Privacy Risks and Approaches," Copyright 2012 CRiSIS, 9 pages.
Wang et al., "Data Leakage Mitigation for Discretionary Access Control in Collaboration Clouds," Copyright 2011 ACM, 10 pages.

* cited by examiner

IDENTIFICATION AND HANDLING OF ITEMS TO BE IGNORED FOR SYNCHRONIZATION WITH A CLOUD-BASED PLATFORM BY A SYNCHRONIZATION CLIENT

CROSS-CITED TO RELATED REFERENCES

The present application claims priority benefit to U.S. Provisional Patent Application No. 61/822,170, entitled "Identification And Handling of Items To Be Ignored For Synchronization With A Cloud-Based Platform By A Synchronization Client," filed on May 10, 2013, in the United States Patent and Trademark Office.

BACKGROUND

The transition to all digital content in collaborative settings and/or other organizational settings has become the preferred mechanism for project, task, and work flow management. Access to that shared content is needed for streamlined collaboration and sharing of digital content and documents. In such collaboration environments, multiple users share, access, and otherwise perform actions or tasks on content and files in shared workspaces.

In collaborative cloud-based environments, any number of updates may occur across the cloud-based platform at a given time. The updates may include any type of update, such as new files being created, modification of files by various collaborators, or even sharing permissions for a given file. When collaborators are continually accessing shared files, maintaining a local directory of those files may facilitate access to those files, however, local versions may not reflect the most recent updates to that file. As such, a collaborator may be required to access the shared filed via web-server and download the most recent version to see those updates. Still, if other collaborators are working on the shared file, the version is outdated and will not reflect the most recent version.

DETAILED DESCRIPTION

Figure 1:
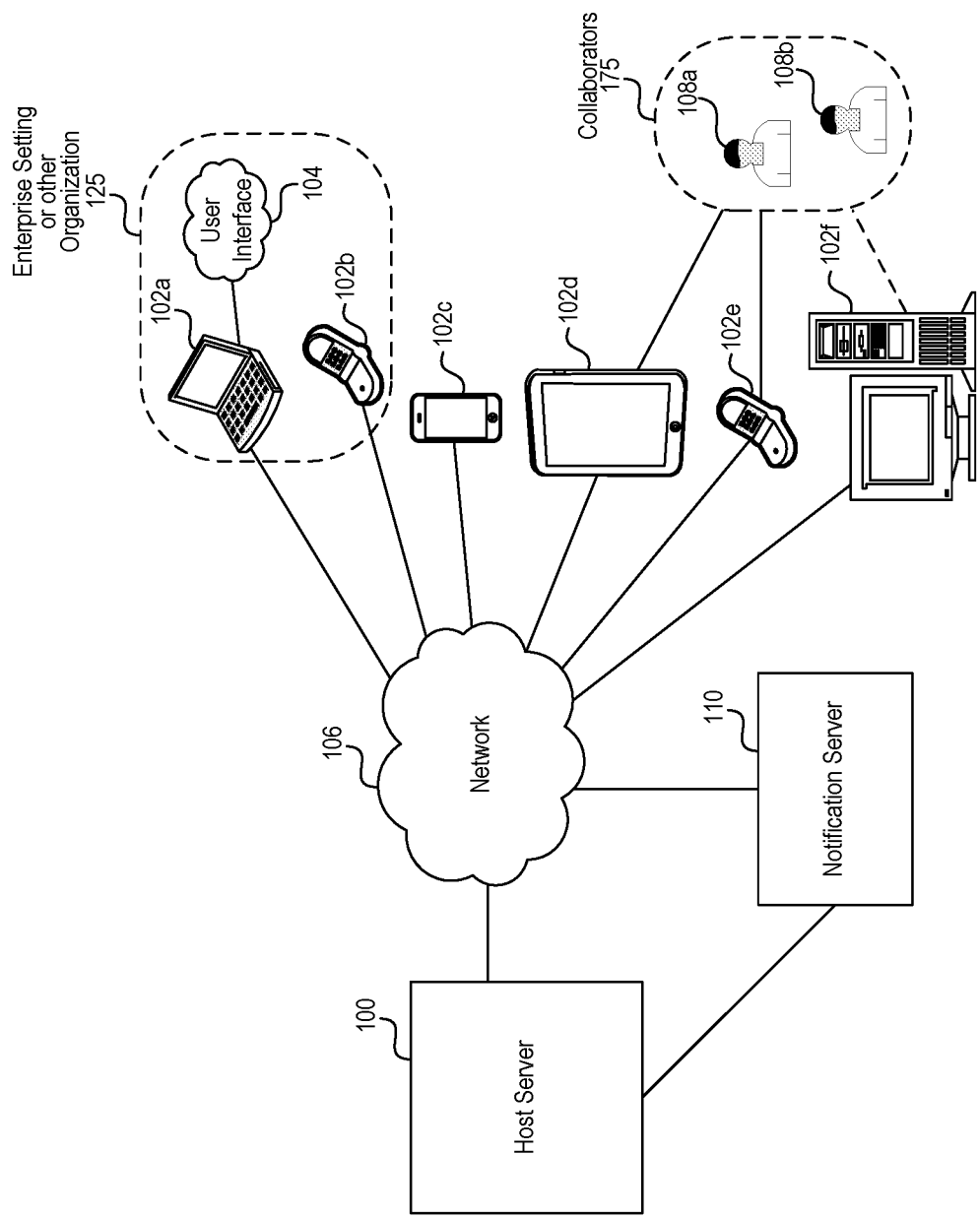
FIG. 1 illustrates a diagram of an example system having a host server of a cloud-based platform and/or cloud storage accounts in a cloud-based collaboration environment.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods to automatically upgrade or update a synchronization client to a cloud-based platform. For example, the components of the present disclosure include a synchronization component, i.e., a Sync Executable Component and an Upgrade Component which may be implemented through the synchronization client to ensure locally accessed items are synchronized with the versions on the cloud-based platform as well as ensuring the correct version of the local synchronization client is being utilized.

The Sync Executable component can include instructions for performing methods to check for version updates, download the updates, store the updates in an appropriate source file location, and launch the Upgrade Component. The Upgrade Component can include instructions embodied on a computer readable medium for performing various method to upgrade the synchronization client, such as verifying certificates in the downloaded files, installing the downloaded updates in a destination file location, and restarting the synchronization process.

The synchronization client may be implemented in a cloud-based collaboration platform in which numerous collaborators are modifying work items which are accessed locally through the synchronization client. For example, FIG. 1 illustrates an example diagram of a cloud-based collaboration environment having a host server 100 of a cloud service and/or cloud storage accounts in a distributed architecture. The collaborative cloud-based system may be accessed via a web-server or via a synchronization client, which automatically updates the items include various software applications which update the in which a synchronization client system The client devices 102 (identified individually as client devices 102a-102f) can be any system and/or device, and/or any combination of devices/systems that is able to establish a connection, including wired, wireless, cellular connections with another device, a server and/or other systems such as host server 100 and/or notification server 110. Client devices 102 will typically include a display and/or other output functionalities to present information and data exchanged between the devices 102 and/or the host server 100 and/or notification server 110.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. running on any platform or any operating system (e.g., Mac-based OS (OS X, iOS, etc.), Windows-based OS (Windows Mobile, Windows 7, etc.), Android, Blackberry OS, Embedded Linux platforms, Palm OS, Symbian platform. In one embodiment, the client devices 102, host server 100, and notification server 110 are coupled via a network 106. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination or variation of the above.

Signals received or detected indicating user activity at client devices 102 through one or more of the above input mechanism, or others, can be used in the disclosed technology by various users or collaborators (e.g., collaborators 108) for accessing, through network 106, a web-based collaboration environment or online collaboration platform (e.g., hosted by the host server 100 via a web server). Alternatively, as within the disclosed technology, collaborators may access the cloud-based platform via a locally installed client software program, which automatically synchronizes work items having shared access. Collaborators may utilize client devices 102 to access the collaboration environment through various network interfaces.

The cloud-based collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). Work items and workspaces can be accessed through various operating systems, such as Mac and Windows.

In general, the collaboration platform allows multiple users or collaborators to access and collaborate efforts on work items stored in a distributed database, such as a in a cloud network. Each user can see, remotely, edits, revisions, comments, or annotations being made to specific work items through their own user devices. For example, a user can upload a document to a work space for other users to access (e.g., for viewing, editing, commenting, signing-off, or otherwise manipulating). The user can login to the online platform and upload the document (or any other type of work item) to an existing work space or to a new work space. The document can be shared with existing users or collaborators in a work space. Any edits to a shared item are then synchronized on the cloud-database and reflected to each user capable of accessing that shared item.

In order to maintain a current contents of the aforementioned items on the cloud-based collaboration environment, a synchronization client is often installed on end-user device in order to maintain the most recent version of shared work items. Accordingly, any edits made locally to the shared item are automatically synchronized with the cloud-based platform, which may be accessed by various other end-user devices access those files locally through a synchronization client and/or directly via the cloud-based platform service provider (e.g., host).

Similar to most client applications, synchronization clients also require updating, or upgrades in order to, e.g., provide additional storage capacity or streamline the file sharing across the cloud-based platform on which the items are accessed, etc. The disclosed systems and methods allow for automatic updating and upgrading of the synchronization client to a cloud-based platform without user interaction and in a silent and secure implementation.

Figure 2:
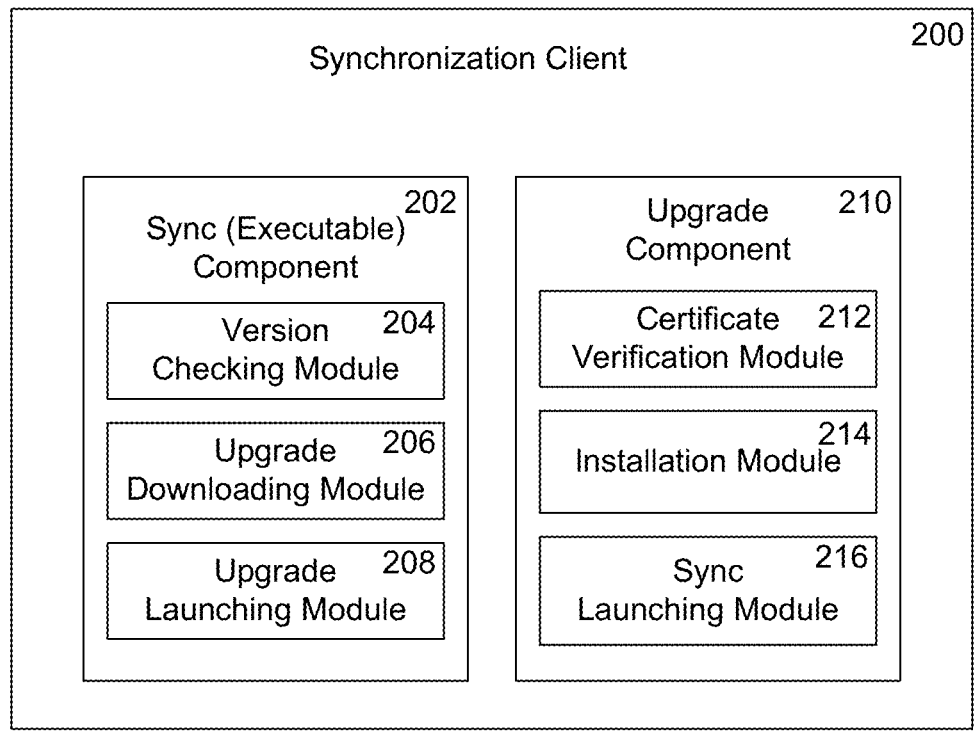
FIG. 2 illustrates a diagram of a synchronization client which may be located on a client device in cloud-based collaboration environment.

FIG. 2 provides an block diagram of the exemplary components for synchronizing an upgrade in a synchronization client. As illustrated, the synchronization client 200 may include a Sync Executable Component 202 and an Upgrade Component 210, each having various modules representing sub-processes that occur within each process. For example, the Sync process may include a version checking module 204, an upgrade/update downloading module 206 and an Upgrade launching module 208. The Upgrade process may include a certification verification module 212, an installation module 214, and a Sync re-launch module 216, which continues the update checking for new version of the synchronization process. Each of the processes implemented in these modules is further explored in the following disclosed embodiments.

Figure 3:
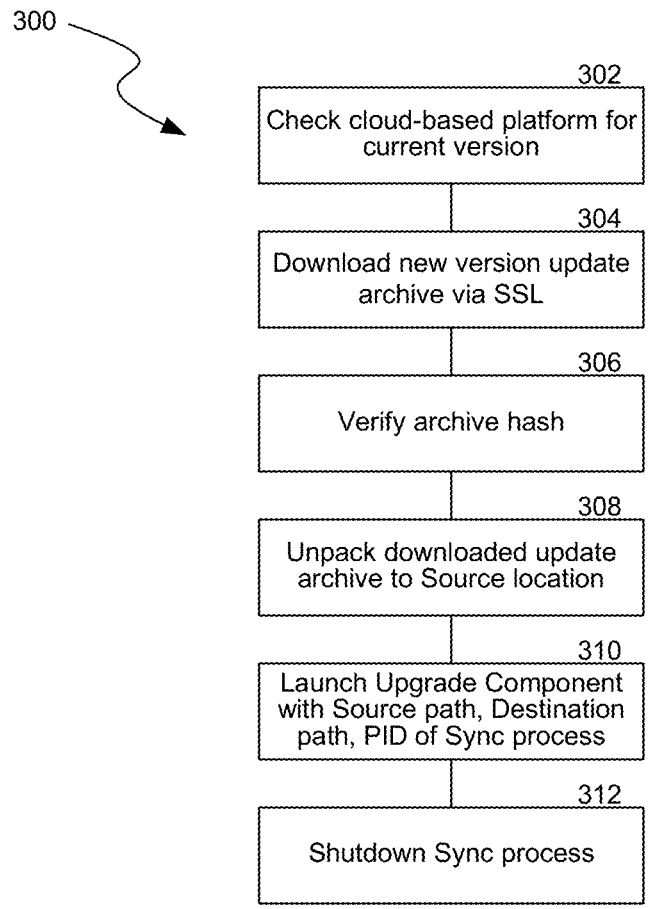
FIG. 3 illustrates a flowchart of a synchronization method for updating shared items through synchronization client in a cloud-based collaboration environment.

Referring to FIG. 3, a flow diagram including a basic method 300 for implementing the Sync Executable component is illustrated. The Sync Executable component can be a process that loops to continually check for updates or upgrades for the synchronization client to the cloud-based platform. The Sync Executable method can be implemented in various steps, such as those detailed below.

In step 302, the Sync process checks the cloud-based platform for current version with a version checker component.

In step 304, if a new version exists, the Sync downloads the new version update archive via SSL.

In step 306, the Sync process verifies the archive hash.

In step 308, the new binaries are unpacked from the downloaded update archive to Source location.

In step 310, the Sync process launches the Upgrade Component and provides the Source path, Destination path, pid of the Sync process (for later re-launch).

In step 312, the Sync process ends.

On a Mac platform, for example, os.fork can be used to generate a new detached child process to run the Upgrade Component.

On a Windows platform, various install options exist for implementation. For example, in one embodiment, the components can be installed to Program Files rather than Appdata\Local on Windows. In order to enable silent updates in Program Files, only processes with appropriate privileges are launched. In another embodiment, the implementation includes a Windows service running with elevated privileges to proxy any upgrades.

A concern presented by installing into Program Files is that particular file location requires elevated privileges in order to write into it. The disclosed Update Component should be implemented on a Windows service that runs continuously with elevated privileges. So, in such an embodiment, the Windows service can install into Program Files on behalf of the Sync Executable component.

A concern presented by installing into Appdata\Local is that enterprise information technology (IT) groups typically do not prefer applications to be installed in any location other than Program Files. There may be deployment issues when installing into specific user contexts. However, with Appdata\Local a special Windows service to install on behalf of the disclosed components for auto upgrades is not needed.

The process implemented by the disclosed methods can pass the Upgrade Windows Service to the Upgrade Component along with any additional information requests, i.e., arguments, for the Upgrade Component (e.g., source, destination, pid). Communication to this 'root' service can be over insecure IPC because the process is a user process. In some embodiments, in order to ensure security, the Upgrade Component can both lock the source executable and verify its certificate.

The Upgrade Windows Service can be added and started during the initial install of the synchronization client to the cloud-based platform. In general, the synchronization client can be also updatable during a typical upgrade process.

Figure 4:
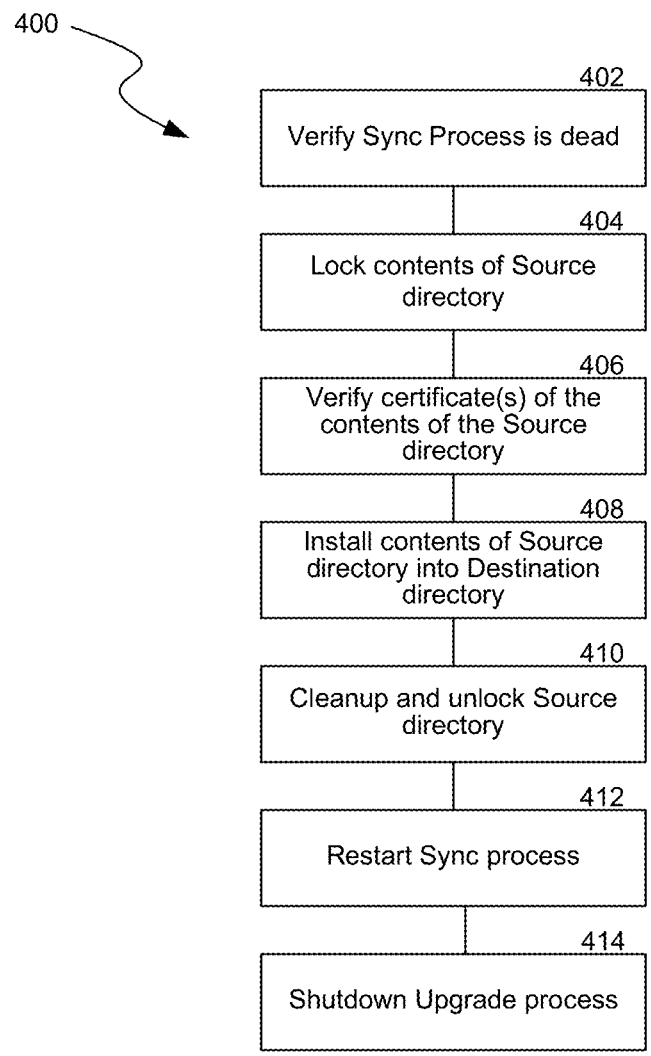
FIG. 4 illustrates a flowchart of a method for updating shared items through synchronization client in a cloud-based collaboration environment

Referring to FIG. 4, a flow diagram including a basic method for implementing the Upgrade Component process is illustrated. As shown, the method includes the steps of verifying the Sync Process has ended, locking the contents of the source directory, verifying the certificates of the contents on the source directory, installing the new binaries (e.g., the .app contents of the source directory to the destination directory), cleaning up and unlocking the source directory and then restarting the update process. The Upgrade is then complete and the Update component is shutdown until called upon again by the Sync Executable Component. Each of these steps is further detailed below.

In step 402, of FIG. 4, the Upgrade Component verifies the Sync process is complete in order to ensure the successful download of the executables prior to beginning the installation process. If the Sync process is complete, the Upgrade process continues. If not, the Upgrade process exits and the system loops back to the Sync process.

In step 404, the Upgrade process can lock the source files of the downloaded executable in order to ensure that no interrupts occur during the installation process.

In step 406, the Upgrade process verifies certificate(s) of the executables ensure a secure install.

In step 408, the new binaries, or contents from the source directory are installed on the client device.

In step 410, the Upgrade process can unlock the source directly files and also clean up the files associated with the synchronization client to remove any unnecessary files and/or folders.

In step 412, the Upgrade process can re-launch the Sync process to check for new versions on the cloud-based platform.

In step 414, the Upgrade process ends.

The following embodiments provide an exemplary implementation of the Upgrade Component method. In general, the disclosed methods can be implemented in a shared script, such as Python. For example, the basic upgrade process and error handling may be performed in Python script-based processes. To perform OS-specific processes, there can be separate OS-specific delegate implementations which inherit from a base class. The base class can define, for example, an interface to be used within the upgrade script.

In some embodiments, certain processes or functions, such as the below-stated delegate.confirm_parent_process_is_dead( ), can be shared between different operating systems, e.g., Mac and Windows. However, certain processes or functions can be OS-specific, such as delegate.install_contents_into_destination( ). As mentioned previously, the particular destination location in which the Upgrade Component is installed may differ by platform and associated privileges.

An example of the upgrade script is outlined as follows:

```
from __future__ import unicode_literals
import sys
from app.auto_update.installer.upgrade_delegate import UpgradeDelegate
def main( ):
    # possibly some more args passed to initializer
    delegate = UpgradeDelegate(src=sys.argv[1], dest=sys.argv[2], parent_pid=sys.argv[3])
    # blocking call that will continue checking (upto a timeout) if process is dead
    # returns True if parent process is dead, False otherwise
    parent_is_dead = delegate.confirm_parent_process_is_dead( )
    if parent_is_dead:
        delegate.lock_contents_of_source( ) and delegate.verify_certs(
        )
and
        delegate.install_contents_into_destination( )
        # release locks, possibly roll back if there was an error
        delegate.cleanup( )
        delegate.launch_sync( )
if __name__ == "__main__":
    main( )
```

In certain embodiments, the Upgrade Component process can differ in implementations of file locking, certificate verification, and placement/storage of files, based on the different platforms, or operating systems, where it is being installed and executed, e.g., Mac or Windows.

On a Mac platform, the downloaded archive file is formatted in a .dmg format which appears on the desktop of the user interface. The .dmg files are generally read-only. The .dmg archive can be mounted at a random location and verification can be performed in this mounted directory. The binary (*.app) can then be copied from this mounted directory to the install location immediately after verification. The fact that the mounted .dmg is read-only is sufficient security to verify signatures and copy the verified bits to install destination location just prior to launching the new bits.

On Windows platforms, a process with elevated privileges is used to run the disclosed Upgrade Component. To implement security, the verification and execution of the .msi file can be made atomic to any non-root process. In one embodiment, this can be achieved by locking the .msi before verification and execution.

On a Windows platform, the kind of locking can be implemented in Python script, for example, by calling the CreateFile command. An exemplary call command for CreateFile can be implemented in the following method:

```
_ handle = win32file.CreateFile("<pathTo.msi>",
    win32file.GENERIC_READ,
    win32file.FILE_SHARE_READ,
    None,
    win32file.OPEN_EXISTING,
    win32file.FILE_ATTRIBUTE_NORMAL,
    None)
```

The aforementioned method includes options to open the .msi with both read access and read share permissions using win32file.FILE_SHARE_READ.

Verification of certificates is understood by the Windows platform, so standard Windows APIs can be used in the verification process. Installation of the binaries (zipped program files) can be accomplished by running an .msi installer in silent mode. This will likely be the same .msi as a normal install. Using an .msi can take care of the transactional nature of installation and handles rollback on error. The .msi can be signed, which includes signing the installed binaries now located within the .msi.

The synchronization process is re-launched (e.g., step 412 in FIG. 4). To re-launch the synchronization client after the Upgrade process as a user process, one of two example approaches can be taken. In one embodiment, the system can launch an additional "re-launcher" user process from the original Sync process before the process ends, or the system can re-launch Sync directly using the win32 CreateProcessAsUser API or a similar API.

In one embodiment, an alternative method can be utilized for updating instead of using an .msi. For example, in step the installation of the unpacked archive, includes a process of copying those unpacked files into the destination location. This is advantageous because the code in the Update process can be used cross-platform, e.g., on both Mac and Windows operating systems.

If an .msi is used, then the process is included with a standard Windows installation. The process may not be able to verify the certificates on the binaries inside the .msi. However, the Upgrade Component can sign the .msi and the certificate on the msiI can be verified as a whole.

The synchronization upgrade should only require administrative privileges for the first-time install. Automatic upgrades are implemented to not require admin rights. The synchronization upgrade process can also use a shim shell extension or finder injection that does not need to be updated, even if new features are added.

When an upgrade is available, the synchronization client can upgrade itself on a client device without a user's knowledge. For example, no finder and/or Internet engine (e.g., Explorer) restart are necessary, no visual indicators (e.g., icons should not blink), no re-scan of existing files, and no admin password entry are required. In general, a usually remains "signed in" to the synchronization client and all programs running at the time of an update. In one embodiment, the computer system tray icon or menu bar icon does not appear to remain "signed in" (e.g., selected or existing at all on tray/menu bar).

Feature updates can obey admin client settings, which can lock down enterprises to a specific version of the synchronization client. In some embodiments, minor version updates and security fixes do not need to obey this setting and those version updates and security fixes automatically upgrade on the client system.

In certain embodiments, specific versions can be upgraded to a subset of users. Such an embodiment is helpful in rolling out updates and to gradually provide them to all users while reducing the support load and issues (e.g., bugs) which arise and need to be fixed after an update is provided. In one embodiment, free users are provided the first roll out of new updates.

One embodiment of the present disclosure includes an automatic upgrade framework for a synchronization client which can be used across multiple platforms, or operating systems, i.e., MAC and Windows.

In an additional embodiment, the upgrade process can be fault tolerant. For example, if the download of the new executable file fails, or launching the new executable program file fails, the synchronization client does not fail and the user will not experience any client interrupts. This is because in these and other unanticipated error scenarios, the auto upgrade module is implemented to be fault tolerant by restoring the user to a functional synchronization client.

An example of the upgrade system can include, for example, a number of processes including a version checker, a downloader, and an installer. Each module is implemented at a certain stage in the upgrade process and is dependent on the prior module completing its task.

For example, the version checker is able to check if there is a newer version of the synchronization client available for the client system, or device. Since, in general, enterprises have the ability to set a maximum version to which their users can upgrade, the version checker can include an specific API call function to determine the allowable version of synchronization to which the user may upgrade. The API call function can use the username and/or authorization token on a client device and return, for example, a version number, a signature of a zipped binary (e.g., SH1 signature), and a download URL to the zipped executable program of the correct version.

The version checker then compares the current running version of the synchronization client to the version returned by the API call function to the host server and initiate a download if the version from the API call function is a newer version, e.g., greater than the currently installed version. In one embodiment, the version checker can execute at time intervals, such as every twenty-four hours, to check for a new and approved version.

In one embodiment, to prevent an infinite upgrade loop, the version checker can periodically check a file named launch_sync.<new_version> to determine a number of times an upgrade to the current <new_version> has been attempted. The installer can create the file in which it updates the number of attempts to upgrade to the <new_version>. If that number reaches a retry threshold limit, the version checker may not initiate the downloader (and, consequently, the installer), thus stopping any further upgrade to <new_version> until a newer version is released.

The downloader component can download the zipped executable to a temporary or source location and verify the signature (e.g., SH1) of zip, or archive program file in a secure sockets layer (SSL). The downloader component can also verify the archive hash of the zipped executable.

The installer component can be initiated once the download and signature verification is successful. For example, the processes can include the synchronization component's upgrade to generate a new process (e.g., a Python process) running an installation script. The installer can create (e.g., open an existing file) to a file named, for example, "launch_sync_<new_version>". When this file is opened, the installer also updates the count of install attempts to <new_version>.

In step After the installation, the synchronization (Sync Executable, FIG. 2) component will gracefully shut itself down. In one embodiment, the installation script can then rename the file by appending a version number as an additional extension. The installation script can unzip the new executable zip file and copy the executable to the correct platform specific directory, such as "/Applications" for Mac platforms or "App Data" for Windows platforms.

If unzipping or copying fails, the installation script can copy the older version of synchronization back to the platform-specific directory, renaming it back to the prior version by removing the version number extension, and launching the synchronization component again.

If unzipping and copying the new executable succeeds, the installation script can launch the executable from the correct platform-specific directory. Upon launching successfully, the executable can send out a notification to the installation script stating that it launched correctly. This can likely be after the sync framework has launched successfully. Also, after the new executable has successfully launched, the installation script can then remove the files in temporary directory and can exit.

In some embodiments, if launching fails, the recovery plan to rename to older version of the synchronization client can be executed. A failure to launch can be remotely logged with sufficient information to diagnose the problem. In one embodiment, if a 'successfully launched' or similar notification is not received with in predetermined time period after the installation, e.g., a number of seconds, the installation can be deemed as a launch failure and the aforementioned recovery plan process may begin.

In an event that the installer itself needs to be patched and/or updated, a method can be implemented in the admin_client_settings API, or any other API which is utilized to determine a user's approved synchronization version. For example, admin_client_settings API can be called and can return a set of extra key value pairs that only the software developer can modify. One of the key value pair can include, for example, patch_installer=true/false.

Since admin_client_settings or other similar API can be called every few hours, it can obtain a key value pair instructing it to replace the installer. This can then trigger a download of a new installer script, which can replace the old installer script.

Ignored Items

Various of the disclosed embodiments include systems and methods for the management of file and folder synchronization in a cloud-based platform (e.g. Box). Some embodiments contemplate a system which synchronizes files and folders between a local machine and a cloud-based platform. In some instances, some objects should not be synchronized, e.g., should be ignored. These items (e.g., objects) may include, e.g., temporary or hidden files, folders, symbolic links, other special files or folders, etc. Certain embodiments contemplate systems and methods for identifying these ignored items and elegantly removing them from the synchronizing process.

Certain embodiments contemplate the ability to flag the appropriate items as "ignorable". This flag may be a static definition in some embodiments. The flag may not be an end user feature allowing for ad hoc tagging of items as ignored, either locally or via the cloud-based platform. Neither is the tag used for files that fail to synchronize for some reason in some embodiments.

Based on the tag, these objects may be excluded from synchronization. This may be the case in both directions. For example, exclusion can be from the client device to the database, or storage system and from the storage system to the client device. The tag-based exclusion of these objects can prevent "ignored" local files from moving to the cloud-based platform and prevent "ignored" remote storage files from moving to local.

Some embodiments may handle transitions between "ignorable" and "syncable" states for a given object, effectively either creating or deleting the object in question. Some embodiments may provide the information necessary to support the synchronization operation. This may be achieved through "ignored item" notifications sent to all registered components, similar to notifications triggered by the SEQ.

In some embodiments, the following types of objects may be ignored for synchronization: Hidden (files only), System (files only), Temporary, Links (shortcuts, symbolic links, aliases, etc.), Web-based files (e.g. Box files), and similar file types.

In some embodiments, the implementation will normalize platform-specific behavior, defining a single notion of what is an ignorable item. For example, all files beginning with a '.' (dot) may be treated as hidden files, regardless of the platform. If an item exists on the cloud-based platform that would be flagged as ignored were it to be pulled down locally, that item may be treated as "ignored", and thus it will not be synchronized to the local system. For example, a cloud based platform/service file called ".Happy Days" may not be synchronized because files beginning with a '.' are considered hidden, and thus they are ignored.

Some hidden or system folders may be synchronized (i.e. not flagged as "ignored," "ignorable," or "ignored item"). In alternative embodiments, only some hidden or system files may instead be marked "ignorable".

In some embodiments, the synchronization is implemented in a File System (FS) adapter pipeline component for both local and cloud-based platform services. In general, raw_event may enter the File System adapter pipeline. File System attribute information may then be added to raw_event at the local pipeline only. The raw_event may flow through the filter pipeline as per normal operations, or the raw_events may be translated to synchronization events.

For example, a filter may tag "ignorable" synchronization events using a plurality of business rules. In some embodiments, the filter may perform various functions to synchronize events involving ignorable items. For example, the filter may provide a transition of ignorable→syncable may be rewritten as a CREATE, a transition of syncable→ignorable may be rewritten as a DELETE, and a transition of ignorable→ignorable event may be completely discarded.

The aforementioned process, and slight variations thereof, may exist in both the local and cloud-based platform. In some embodiments, the cloud-based platform service-side operation may exclusively be based on file naming conventions.

In some embodiments, the parameter Item State associated with an object will have a new property, e.g., syncability. In such an embodiment, the corresponding ItemSyncability enum data type may have values such as, SYNCABLE, IGNORABLE, and PROBLEMATIC.

An item whose item_state.syncability property has a value of IGNORABLE may indicate that this item is "ignorable". This property and enum may be apart from the ItemSyncStatus enum data type and the notifications triggered by the IconManager, which also use the ItemSyncStatus enum data type.

Local FS Adapter

An extended API for the remote and/or local storage system software may include a function get_file_info_from_path( ). In some embodiments, the Mac and Windows version of this API will be extended to return all file attribute information pertaining to the Ignored Items feature. For example, in a Mac platform, this may include a 'hidden' attribute of kLSItemInfoIsInvisible or an 'alias' attribute of kLSItemInfoIsAliasFile. The attributes may be returned via the objc API in a Mac platform.

Similarly, in a Windows platform, a filter, such as LocalPopulateFileSystemStateFilter, can be utilized to pull the "hidden" and "system" attribute information determined by the objc API and subsequently to place it in the raw_event. The LocalPopulateFileSystemStateFilter filter may be based on an existing filter in the system.

A Tag Ignored Item Filter can set the item_state syncability property to "IGNORABLE" as appropriate. This may apply both to the naming convention rules and the attributes associated with the file.

An Ignored Item Rewrite Filter can perform a plurality of functions to compare the before and after states of a particular item. For example, in a syncable→syncable (technically: [syncable|no-state]→syncable) state, the filter performs no actions on items in this state. The events may simply be passed along. Similarly, in an ignorable→ignorable (technically: [ignorable|no-state]→ignorable) state, no action is performed on the item. However, a notification may be sent to all registered handlers that this item is being ignored. The event may then be discarded and may never reach the Sync Event Queue.

A transition state, such as ignorable→syncable can occur due to moves or edits to the item, such as when the file attributes changed. The event may be rewritten as a CREATE and passed along.

A transition state of syncable→ignorable can also occur due to moves or edits (e.g. file attributes changed). The event may be rewritten as a DELETE and passed along.

The item and its item_state parameter may be placed into the shadow, thus allowing this code to determine the aforementioned transitions during subsequent events that compare old and new states (e.g., item_state).

Cloud-Based Platform FS Adapter

The logic in the cloud-based platform (e.g., collaboration and/or storage, personal or enterprise) pipeline may be very similar to the local pipeline. Much, if not all, of the code in the filters may be shared with the local counterpart. For example, a Tag Ignored Item Filter may be a simplified version of the local filter. Only the file naming rules may be used to set the IGNORABLE flag. Additionally, an Ignored Item Rewrite Filter may be similar to its local filter counterpart and may perform analogous functions. For example, a syncable→syncable event may be passed along without further action. An ignorable→ignorable event may be discarded and a notification sent. An ignorable→syncable event may be rewritten as a CREATE. Finally, a syncable→ignorable event may be rewritten as a DELETE.

An alternate implementation may have Synchronization Events for "ignored" items flowing into the Synchronization Event Queue. This can leverage existing logic for getting an item's synchronization status into the IconManager or Iconizer. New logic for the Synchronization Executors may be included to drop various synchronization events for "ignored" items.

Further, in some embodiments, file system (FS) adapters and the filter or pipeline may normalize the stream of events coming from local or cloud-based platform (e.g., collaboration and/or storage, personal or enterprise) in order to filter out the noise, the platform specifics, etc. An atomic save transformation may happen in the pipeline, expansion of cloud-based platform raw_events into multiple sync_events may occur in the pipeline, etc. Handling ignorable files (hidden files, aliases, or web-based documents) in the file system adapters may be suitable given these considerations.

In some embodiments, platform-specific unit tests may be performed to verify that attributes are properly retrieved by the respective extended file system API's. For example, Item_state unit tests may verify that the new 'syncability' property is properly handled (copied, merged, etc). The unit tests may be implemented on the aforementioned filters or pipelines. Each of the new filters, both on the local side and on the cloud-based platform/service side (e.g., collaboration and/or storage, personal or enterprise), may have unit tests verifying their specific behavior.

In certain implementations, each of the filters or pipelines may have broader tests performed on them to verify behavior in some fundamental cases. For example, these cases can include: ignorable→syncable, syncable→ignorable, and ignorable→ignorable. The tests may verify proper results to ensure that the expected notifications are triggered.

On a Mac platform, a changing of the 'hidden' attribute (e.g., a command line of: chflags hidden <file-name>) does not trigger any watchdog events. In contrast, one may expect to see an "Edit" event. On a Windows platform an Edit event may be also generated. Various embodiments include adaptive techniques across the platforms, e.g. including OSx. In some embodiments, interoperability between 'aliases' and other linking on different platforms through symbolic links is provided.

In certain embodiments, cloud-based platform, or service events (e.g., collaboration and/or storage, personal or enterprise) may be expanded in some embodiments into multiple sync-events in order to transform an item from the old state to new state. In some embodiments, Ignore Filters may be placed subsequently, e.g., "after", in the pipeline to accommodate transitions between ignored and syncable. For example, similar to an Ignored Item Rewrite Filter.

In some embodiments, folders that are hidden on the desktop are always synchronized. In addition, some embodiments may have the consequence that non-hidden files in a hidden folder will be synchronized.

Figure 5:
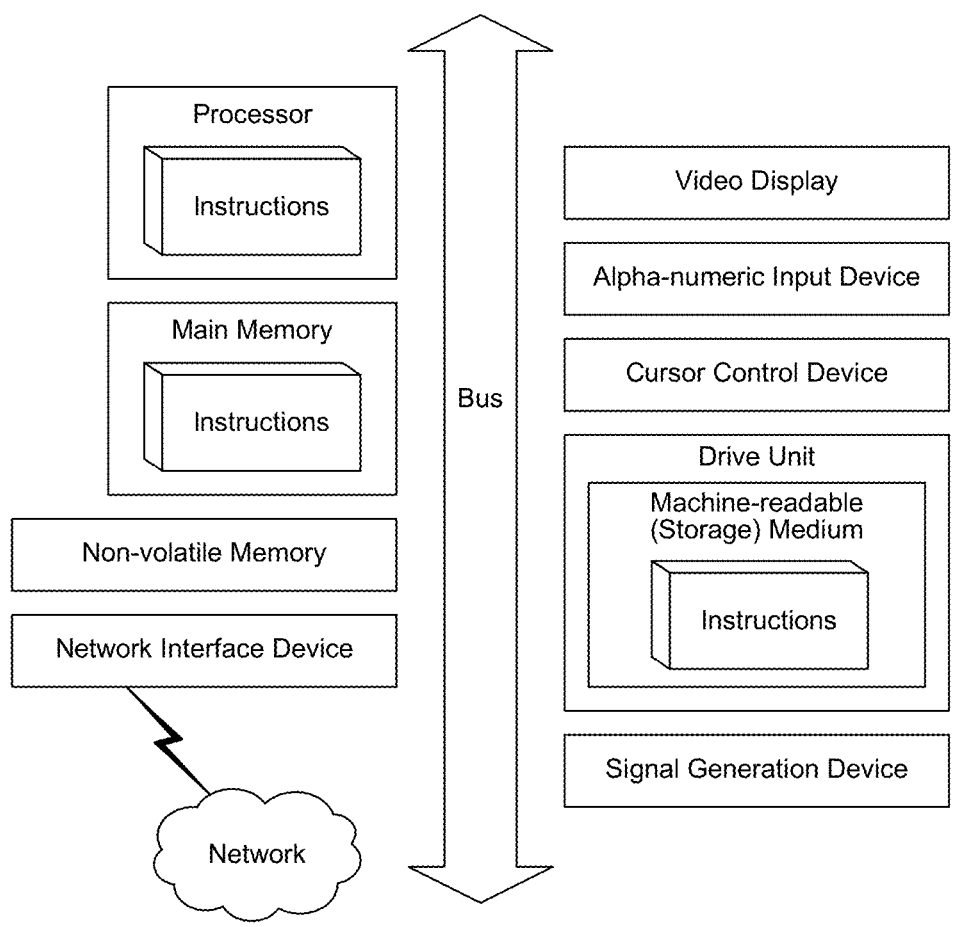
FIG. 5 illustrates an exemplary computing device on which the disclosed methods may be implemented.

FIG. 5 illustrates a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

The invention claimed is:

1. A computer-implemented method of facilitating upgrades to a synchronization client in a cloud-based environment, the method comprising:
    checking, by a synchronization executable component of the synchronization client, a file to determine a number of previous unsuccessful attempts to update the synchronization client, wherein the synchronization client executes on a client device and the synchronization executable component enables synchronization of one or more items stored locally on the client device with the cloud-based environment;
    checking, by the synchronization executable component of the synchronization client, for available updates of the synchronization client on the cloud-based platform;
    upon verifying from the file that the number of previous unsuccessful attempts to install the available updates of the synchronization client is less than a threshold limit:
        storing, by the synchronization executable component of the synchronization client, the updates of the synchronization client on the client device;
        launching, by the synchronization executable component of the synchronization client, an update component of the synchronization client, the update component enables updating of at least one of the synchronization executable component or the update component of the synchronization client;
        verifying, by the update component of the synchronization client, the updates of the synchronization client, wherein verifying the updates includes verifying a hash;
        installing, by the update component of the synchronization client on the client device, the updates of the synchronization client; and
    in response to determining that the number of previous unsuccessful attempts to install the available updates of the synchronization client equals or exceeds the threshold limit, discontinuing, by the update component of the synchronization client, attempts to install the available updates of the synchronization client, continue checking, by the synchronization executable of the synchronization client, for available updates of the synchronization client on the cloud-based platform, and, when a new update of the synchronization client is available, storing, by the synchronization executable of the synchronization client, the new update of the synchronization client on the electronic device, launching, by the synchronization executable of the synchronization client, the update component, verifying, by the update component of the synchronization client, the new update of the synchronization client, installing, by the update component of the synchronization client on the client device, the new update of the synchronization client, and in response to detection of an error condition impacting the new update of the synchronization client, restoring, by the update component of the synchronization client, the synchronization client to a functional state without interruption of the synchronization executable of the synchronization client by the error condition, and incrementing, by the update component of the synchronization client, the number of previous unsuccessful attempts to update the synchronization client in the file.

2. The computer implemented method of claim 1, wherein the storing the updates includes downloading the updates using a secure connection.

3. The computer implemented method of claim 1, wherein the installing the updates includes unpacking binary files from the stored updates.

4. The computer implemented method of claim 1, wherein the installing the updates occurs for a subset of the users of the synchronization client.

5. The computer implemented method of claim 1, wherein the checking for updates is performed by a version checker, the storing the updates and the verifying the updates is performed by a downloader, the installing the updates is performed by an installer.

6. The computer implemented method of claim 1, wherein if the installing the updates fails, reverting to a previous version of the synchronization client.

7. The computer implemented method of claim 1, wherein if the installing the updates succeeds, the synchronization client is automatically launched and any temporary stored files are deleted.

8. The computer implemented method of claim 1, wherein if the installing the updates succeeds, a notification to the cloud-based environment within a preset amount of time.

9. A non-transitory machine readable storage medium encoded with instructions for performing a method of facilitating upgrades to a synchronization client in a cloud-based environment, the instructions configured to:
    checking, by a synchronization executable component of the synchronization client, a file to determine a number of previous unsuccessful attempts to update the synchronization client, wherein the synchronization client executes on a client device and the synchronization executable component enables synchronization of one or more items stored locally on the client device with the cloud-based environment;
    checking, by the synchronization executable component of the synchronization client, for available updates of the synchronization client on the cloud-based platform;
    upon verifying from the file that the number of previous unsuccessful attempts to install the available updates of the synchronization client is less than a threshold limit:
        storing, by the synchronization executable component of the synchronization client, the updates of the synchronization client on the client device;
        launching, by the synchronization executable component of the synchronization client, an update component of the synchronization client, the update component enables updating of at least one of the synchronization executable component or the update component of the synchronization client;
        verifying, by the update component of the synchronization client, the updates of the synchronization client, wherein verifying the updates includes verifying a hash;
        installing, by the update component of the synchronization client on the client device, the updates of the synchronization client; and
    in response to determining that the number of previous unsuccessful attempts to install the available updates of the synchronization client equals or exceeds the threshold limit, discontinuing, by the update component of the synchronization client, attempts to install the available updates of the synchronization client, continue checking, by the synchronization executable of the synchronization client, for available updates of the synchronization client on the cloud-based platform, and, when a new update of the synchronization client is available, storing, by the synchronization executable of the synchronization client, the new update of the synchronization client on the electronic device, launching, by the synchronization executable of the synchronization client, the update component, verifying, by the update component of the synchronization client, the new update of the synchronization client, installing, by the update component of the synchronization client on the client device, the new update of the synchronization client, and in response to detection of an error condition impacting the new update of the synchronization client, restoring, by the update component of the synchronization client, the synchronization client to a functional state without interruption of the synchronization executable of the synchronization client by the error condition, and incrementing, by the update component of the synchronization client, the number of previous unsuccessful attempts to update the synchronization client in the file.

10. The non-transitory machine readable storage medium of claim 9, wherein the instructions to store the updates include instructions to download the updates using a secure connection.

11. The non-transitory machine readable storage medium of claim 9, wherein the instructions to install the updates include instructions to unpack binary files from the stored updates.

12. A system comprising:
a processor; and
a memory coupled with and readable by the processor and storing therein a set of instructions which, when executed by the processor, causes the processor to facilitate upgrades to a synchronization client in a cloud-based environment by:
checking, by a synchronization executable component of the synchronization client, a file to determine a number of previous unsuccessful attempts to update the synchronization client, wherein the synchronization client executes on a client device and the synchronization executable component enables synchronization of one or more items stored locally on the client device with the cloud-based environment;
checking, by the synchronization executable component of the synchronization client, for available updates of the synchronization client on the cloud-based platform;
upon verifying from the file that the number of previous unsuccessful attempts to install the available updates of the synchronization client is less than a threshold limit:
storing, by the synchronization executable component of the synchronization client, the updates of the synchronization client on the client device;
launching, by the synchronization executable component of the synchronization client, an update component of the synchronization client, the update component enables updating of at least one of the synchronization executable component or the update component of the synchronization client;
verifying, by the update component of the synchronization client, the updates of the synchronization client, wherein verifying the updates includes verifying a hash;
installing, by the update component of the synchronization client on the client device, the updates of the synchronization client; and
in response to determining that the number of previous unsuccessful attempts to install the available updates of the synchronization client equals or exceeds the threshold limit, discontinuing, by the update component of the synchronization client, attempts to install the available updates of the synchronization client, continue checking, by the synchronization executable of the synchronization client, for available updates of the synchronization client on the cloud-based platform, and, when a new update of the synchronization client is available, storing, by the synchronization executable of the synchronization client, the new update of the synchronization client on the electronic device, launching, by the synchronization executable of the synchronization client, the update component, verifying, by the update component of the synchronization client, the new update of the synchronization client, installing, by the update component of the synchronization client on the client device, the new update of the synchronization client, and in response to detection of an error condition impacting the new update of the synchronization client, restoring, by the update component of the synchronization client, the synchronization client to a functional state without interruption of the synchronization executable of the synchronization client by the error condition, and incrementing, by the update component of the synchronization client, the number of previous unsuccessful attempts to update the synchronization client in the file.

13. The system of claim 12, wherein the storing the updates includes downloading the updates using a secure connection.

14. The system of claim 12, wherein the installing the updates includes unpacking binary files from the stored updates.

15. The system of claim 12, wherein the installing the updates occurs for a subset of the users of the synchronization client.

16. The system of claim 12, wherein the checking for updates is performed by a version checker, the storing the updates and the verifying the updates is performed by a downloader, the installing the updates is performed by an installer.

17. The system of claim 12, wherein if the installing the updates fails, reverting to a previous version of the synchronization client.

18. The system of claim 12, wherein if the installing the updates succeeds, the synchronization client is automatically launched and any temporary stored files are deleted.

19. The system of claim 12, wherein if the installing the updates succeeds, a notification to the cloud-based environment within a preset amount of time.

* * * * *